United States Patent [19]

Andreev et al.

[11] 4,425,789

[45] Jan. 17, 1984

[54] MONITORING SYSTEM FOR HYDRAULIC PIPELINES AND/OR ACTUATING DEVICES

[75] Inventors: Borislav Andreev, Hagen; Johannes A. Schumacher, Werdohl, both of Fed. Rep. of Germany

[73] Assignee: Kracht Pumpen- und Motorenfabrik GmbH & Co. KG, Werdohl, Fed. Rep. of Germany

[21] Appl. No.: 310,355

[22] Filed: Oct. 9, 1981

[30] Foreign Application Priority Data

Oct. 10, 1980 [DE] Fed. Rep. of Germany ....... 3038283

[51] Int. Cl.[3] .............................................. G01M 3/26

[52] U.S. Cl. .................................... 73/40.5 R; 73/168

[58] Field of Search ............................ 73/40.5 R, 168

[56] References Cited

U.S. PATENT DOCUMENTS

| | | | |
|---|---|---|---|
| 4,152,925 | 5/1979 | Lindh | 73/40.5 R |
| 4,161,115 | 7/1979 | Wetter | 73/40.5 R |
| 4,171,638 | 10/1979 | Coman et al. | 73/168 X |
| 4,181,017 | 1/1980 | Markle | 73/168 |

*Primary Examiner*—Gerald Goldberg
*Assistant Examiner*—Joseph W. Roskos
*Attorney, Agent, or Firm*—Salter & Michaelson

[57] ABSTRACT

A monitoring system for hydraulic pipelines and/or actuating devices including a volume flow sensor having a toothed rotor similar to that in a toothed rotor motor by which movements of the toothed rotor can be sensed by no-contact detectors which emit electrical pulses in respect of discrete quantities of oil displaced by and equal to the volume of a tooth of the toothed rotor. The system also includes a device by which the pulses are processed with respect to the direction of flow through the volume flow sensor and to the pulse frequency. The system also includes an indicator indicative of current operating conditions and a counter by which, after a limiting frequency has been exceeded, the pulses are counted and upon reaching a specified preassigned number of pulses that succeed one another during a period of uninterrupted counting a signal of leakiness is generated.

6 Claims, 2 Drawing Figures

MONITORING SYSTEM FOR HYDRAULIC PIPELINES AND/OR ACTUATING DEVICES

BACKGROUND OF THE INVENTION

The invention concerns a system for monitoring liquid flow in hydraulic (or other liquid) installations, such as pipelines, hydraulic actuating devices or a combination thereof.

The monitoring system with which the invention is concerned comprises a volume flow sensor having a toothed rotor, similar to that in a toothed rotor motor, wherein movements of the toothed rotor are sensed by no-contact detectors which emit electrical pulses in respect of discrete quantities of liquid displaced and equal to the volume of a tooth of the toothed rotor, and a device by which the pulses are processable with respect to the direction of flow through the volume flow sensor and to the pulse frequency, the output of the device indicating of the current operating conditions of the installation with which the monitoring system is used.

DESCRIPTION OF THE PRIOR ART

In known monitoring systems of this kind (DE-OS Nos. 2554484 and 2759263, the Journal "OL Hydraulik und Pneumatik" No. 1/79, article Wetter "Safety Measures In Hydraulic Installations of Continuous Casting Plants") a leakage signal is emitted if a specified number of pulses is counted within a specified time.

In installations having dynamically loaded oil-operated actuating devices, oil flows arise in the installation, of an order of magnitude greater than the tolerable leakage oil flow which would occur in the installation when leakage does occur. In installations having several consumption units, pressure changes can arise as a result of valve switchings, and these likewise lead to considerable oil flows. Finally, oil flows that hinder or prevent the investigation of leaks can be produced by pressure-determining valves which within their tolerance limits can lead to periodic fluctuations of the network pressure.

An object of the invention is to develop a monitoring system of the said kind in such a way that even under the conditions just stated a reliable indication of leakiness or of a leak is still possible.

According to the invention this object is achieved by providing in said monitoring system counting means by which, after a limiting frequency is exceeded, the pulses are counted, and signal-producing means whereby upon reaching a specified pre-assigned number of pulses that succeed one another uninterruptedly, a signal of leakiness is generated.

Preferably only those pulses above the limiting frequency are counted by the counting means.

The counting means may be reset if the specified pre-assigned number is not reached in a period of uninterrupted counting.

The monitoring system operates the more accurately the lower the limiting frequency is set. The lower the limiting frequency is set, the greater on the other hand is the influence of the oil flows that are caused dynamically.

At very low limiting frequencies, in the extreme case at a limiting frequency of zero, the influence of the dynamically caused oil flows can be eliminated by the provision of means whereby for a prescribed time interval the number of pulses is ascertained which results from the difference between the amounts of liquid flowing into and out of said installation, also by the provision of means whereby the sum of the pulses is compared with a specified pre-assigned value, and by means to reset said counting means to the initial value if the pre-assigned value is not attained.

BRIEF DESCRIPTION OF THE DRAWINGS

The invention is illustrated by way of example in the accompanying drawings, and is described in detail with the aid of the drawings, in which.

DESCRIPTION OF THE PREFERRED EMBODIMENTS

Figure 1:
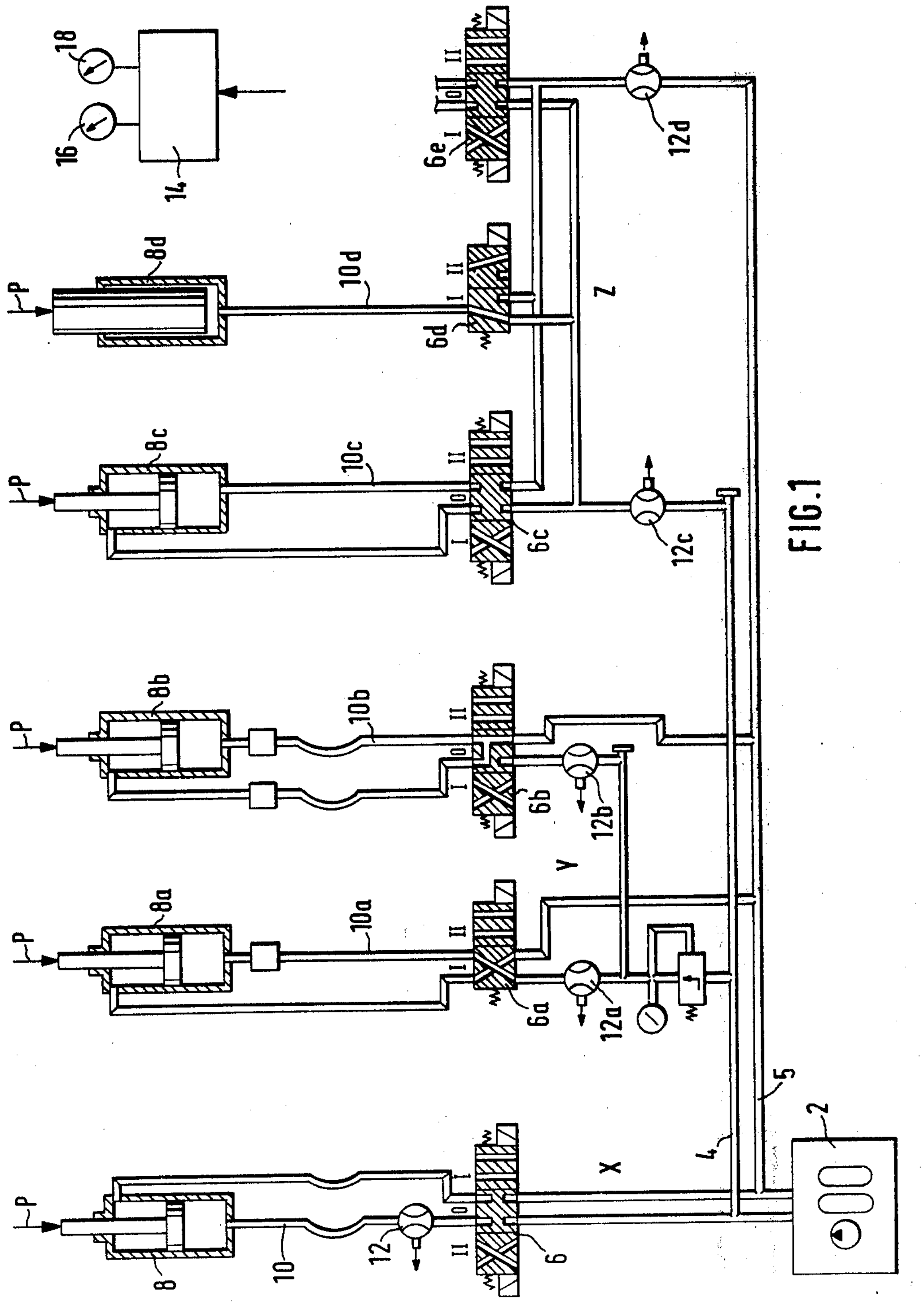
FIG. 1 is a circuit arrangement of a monitoring system in accordance with the invention.

In FIG. 1 the circuit which is schematically shown has a hydraulic pressure station 2, the pump of which, assisted by pressure reservoirs, delivers into a pressurized-oil distributor pipeline 4, to which hydraulic cylinders are connected via control valves. The cylinders work against a load P. In the drawings there are two circuits X and Y with single monitoring and a circuit Z with group monitoring. In the single monitoring circuit X, a volume flow sensor 12 is inserted in an operating line 10 to a drive cylinder 8, between a control valve 6 and an hydraulic cylinder 8. If necessary the volume flow sensor 12 is connected in parallel to check valves. The volume flow sensor 12 is constructed in the manner of a toothed rotor motor having round-toothed rotors (DE-OS No. 2554 486) and is provided with detectors by which the movements of the toothed rotor can be sensed without contact and which from time to time emit an electrical pulse corresponding to discrete amounts of and equivalent to the tooth volume. The detectors can be arranged in such a way that a datum corresponding to the direction of rotation of the toothed rotors is also provided. Further power-consuming units can be connected to the central pressurized-oil pipeline 4 in the same way. During the monitoring period the control valve is switched in such a way that the operating line 10 is connected to the pressurized-oil pipeline 4 (Switching Position I).

The pulses emitted by the detectors are fed into an apparatus 14 in which the processing and evaluation of the pulses is carried out. Connected to it is an indicating means 16 for showing the occurrence of a leak and an indicator means 18 for showing the occurrence of a breakage.

The volume flow sensor 12 similar to a toothed rotor motor has a very high resolving power which is of the order of 1 $cm^3$. Even the smallest liquid flows are, therefore, indicated by the volume flow sensor. With dynamically loaded motive power, oil flows arise in the operating line 10, which either flow back from the operating line 10 into the pressurized oil network 4, or vice versa flow from the latter into the operating line 10. In addition there are not inconsiderable oil flows within the operating lines 10, caused by pressure surges upon opening and closing valves for other power-consuming devices. Finally also pressure-fixing devices such as reducing valves, pressure-limiting valves and the like can lead to a rise and fall of the operating pressure (because of their tolerances), and these changes likewise lead to oil flows through the volume flow sensors 12.

The said oil flows which result from the normal operation of a hydraulic network with several power consuming devices can in the operating lines assume orders of magnitude that are higher than the tolerable losses through leakiness. Thus dynamically caused oil flows can definitely attain values of 30 $cm^3$/min. In the case of a leak, an oil flow of 30 $cm^3$/min would correspond to an oil loss of about 45 liters per day. With the known determination of the discharge per unit of time through the volume flow sensor, in installations where dynamically caused oil flows occur, a recognition and indication of slight leakages, which can certainly be an expression of impending failures, cannot be obtained.

However in spite of the dynamically caused oil flows, through which pulses are produced by the volume flow sensor, detection can be achieved even with an oil leak that is smaller than the dynamically caused oil flow, as described below with reference to FIG. 2.

Figure 2:
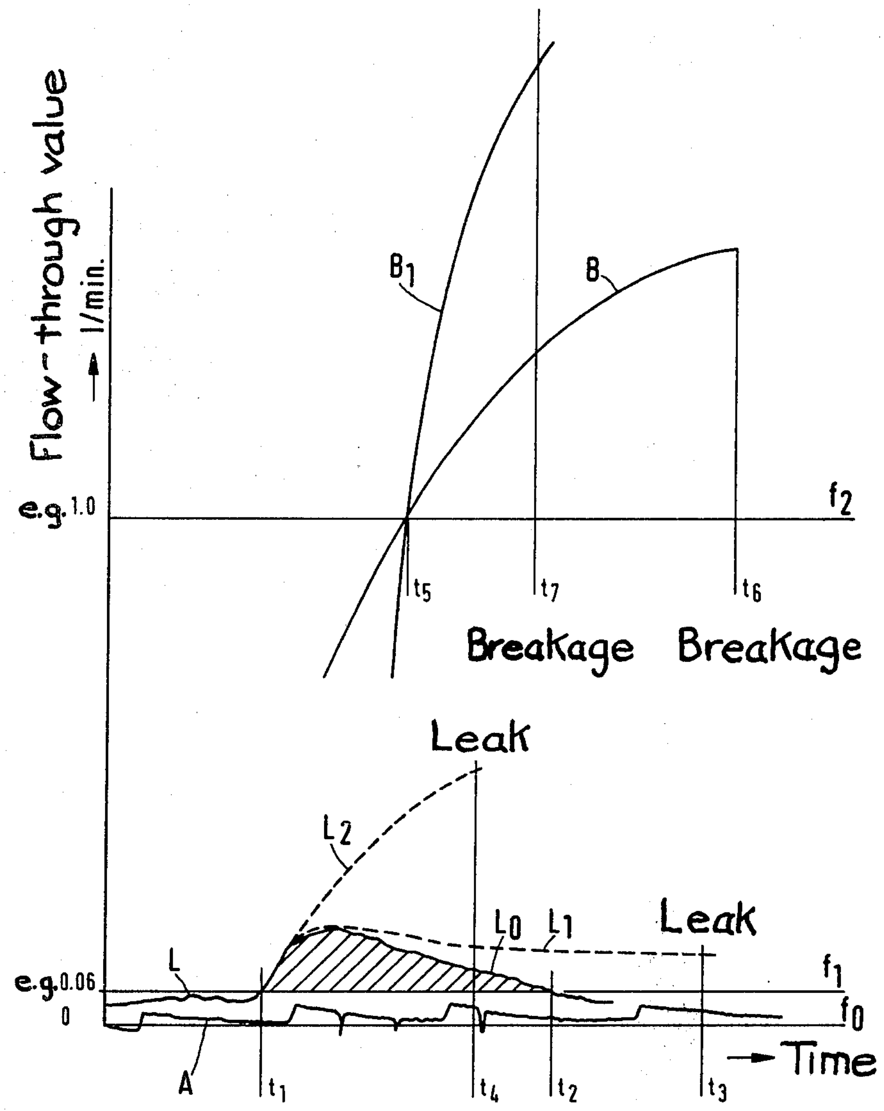
FIG. 2 is a diagram of the mode of operation of the monitoring system.

In FIG. 2 the flow in liters/min is plotted against time. In this, the flow per unit of time corresponds to the pulse frequency for a given volume flow sensor.

With the single monitoring circuit X in which the volume flow sensor 12 is connected beyond the control valve, under operating conditions free of faults, the monitoring region of the volume flow sensor is perfectly hermetic. The control valve 6 is in the switching position I. Upon a pressure rise in the central pressurized oil pipeline 4, which may be due to one of the aforementioned causes, a volume flow caused by compression penetrates into the monitoring region, that is, into the region between the volume flow sensor 12 and the piston of the driving cylinder 8. If there is a fall in pressure, a corresponding volume flow runs out.

The line A in FIG. 2 shows a typical course of a single monitoring circuit X. Theoretically with a hermetic monitoring region a pulse total of zero is to be expected over a prolonged monitoring period, since the sum of the volumes flowing in and out is zero. Because of the differing charging and discharging periods for a pressurized-oil reservoir or accumulator, relatively rapidly rising volume flows into the monitored region arise during or due to charging, while the volume flowing out of the monitored region during or due to discharging flows relatively slowly.

A volume flow sensor of the kind in question has of course a linearity region which extends to a very low level. However at extremely small volume flows, such as occur in the discharge of a pressurized-oil reservoir, the volume flows may fall dimensionally into the nonlinear measurement region of the volume flow sensor. In time this leads to a tendency for the pulse total to pass into the positive region. In order to compensate for this positive pulse count which depends on the volume flow sensor, it is provided that a resetting of the pulse counting is undertaken at prescribed periods of time. For example, such a resetting to zero may be effected at intervals of hours.

For the monitoring of leaks, a pre-assigned pulse value is specified in the counting and evaluation device 14. If the pre-assigned pulse value is reached before a resetting of the counter has occurred, this means that oil is emerging, and thus there is a leak. Then when the pre-assigned pulse number is reached a leak indication 16 is given.

A monitoring for breakage, in the case of the single monitoring circuit X, is based on the fact that very much greater amounts of oil flow out when there is a breakage. A breakage can be differentiated from a leakage by specifying a limiting frequency which is not attained in hermetic monitoring sections when there are dynamically caused volume flows. If the limiting frequency is reached, a breakage alarm 18 is triggered via the device 14, and the alarm can be coupled with a quick shut-off of the control valve 6.

With the single monitoring circuit Y, which in FIG. 1 is illustrated with two different control valves *6a*, *6b*, the volume flow sensors **12*a*, 12*b* are each inserted in front of the control valve. Thereby the volume flow sensors also register the leakage oil flows, conditioned by the design, of the control valves *6a* and *6b* inserted after the sensors. Such a leakage oil flow leads to a positive pulse count. In order to register small leakage oil flows here, in the same way, a limiting frequency $f_1$ (see FIG. 2**) is stipulated for the pulse count; this frequency is higher than the count frequency than that which occurs by reason of the normal leakage flow of the control valve. In this way the flow with a pulse frequency lower than a limiting frequency $f_1$ is excluded from the count. The pulse count begins only when the pulse sequence exceeds the limiting frequency $f_1$.

In the diagram in FIG. 2, a flow corresponding to the curve L is plotted as an example of this. Up to the time instant $t_1$ a flow is present which leads to a pulse frequency which is lower than the limiting frequency and for instance may be attributed to the leakage oil flow of the valves. No pulse count results. At the time instant $t_1$, the limiting frequency is exceeded and the pulse count begins. The flow follows the continuous line $L_0$ which encloses the hatched area. At the time instant $t_2$, the line $L_0$ passes below the limiting frequency $f_1$ again. The number of pulses counted from the instant $t_1$ to the instant $t_2$ is smaller than the number of pulses specified as the pre-assigned number for a leak. Therefore the number of pulses counted is above the limiting frequency results from a dynamically caused volume flow. Thereupon a resetting of the counter ensues at the instant $t_2$.

If the course of the counter follows, for example, the dotted line $L_1$, at the time instant $t_3$, a quantity of oil has passed through uninterruptedly which is greater than the specified pre-assigned amount. In that case a leak signal is given out at the instant $t_3$. An analogous situation occurs if the oil flow runs correspondingly to the line $L_2$. Here the increase of the oil flow is considerably more rapid. The specified pre-assigned pulse number is attained at the time instant $t_4$, at which a leak signal is given out. A volume flow sensor in the circuitry of the single monitoring circuit Y also indicates variations of leakage oil flow from the control valve. It also indicates leakiness of the piston sealing in the cylinder, if owing to wear, the leakage oil flows lead to flows at which pulse counts having a frequency above the limiting frequency occur. By adjustment of the limiting frequency $f_1$ according to the leakage oil flow of the control valve at the time of installation, if, when the leakage oil flow of the control valve increases, the limiting frequency is permanently exceeded and there is a continuous positive pulse count, the latter indicates the increase of the leakage oil flow of the control valve as a leak. The same holds true for the piston seal.

For a breakage signal, with the single monitoring circuit Y, a second limiting frequency $f_2$ is advantageously specified, which is of an order of magnitude, higher than frequency $f_1$, in order to make it possible to distinguish a leak and a breakage. The signal-processing device 14 can be designed in such a way that when the limiting frequency $f_2$ is attained, a breakage alarm is triggered off, i.e. at the time instant $t_5$ at which the flow curve B or $B_1$ rises above the limiting frequency $f_2$. For safety, however, yet another pulse count can be undertaken after passing above the limiting frequency $f_2$. The pre-assigned pulse count is then, for the curve B, for example, reached at the time instant $t_6$, and for the very much steeper curve $B_1$, at the instant $t_7$. The breakage alarm would then be set off at the instant $t_6$ or $t_7$ respectively.

In a group monitoring circuit Z in FIG. 1, the operating pipelines and drives of an actuating group are monitored with a volume flow sensor 12*c* and 12*d* in both the common pressure and return lines. In this connection it is advantageous to cause the operating oil stream to flow through by-pass valves assigned to the respective volume flow sensors, in order to be able to operate with small volume flow sensors. The by-pass valves must however produce such a pressure drop that the volume flow chosen to detect a leak or breakage passes through the volume flow sensor in all cases.

Monitoring is effected when the actuating devices are at rest and the control valves are open.

With the group monitoring circuitry Z, the flows through the two volume flow sensors 12*c* and 12*d* are compared with each other. If the monitoring region is completely hermetic in the outward sense, the volume flow sensor 12*d* indicates a somewhat greater flow than the volume flow sensor 12*c* . The difference corresponds to the relaxation volume of the volume flow between the entry under pressure from the pipeline 4 and the assentially pressure less emergence into the return path 5.

The arrangement according to the group monitoring circuit Z has the advantage that as the number of actuating cylinders increases the number of volume flow sensors remains the same. A disadvantage is the fact that a leak or a breakage within the group has to be located separately.

The group monitoring circuit Z can offer advantages in conjunction with a microprocessor. Monitoring can then be carried out during the whole period of operation. Equally an automatic localization of leakiness, whether due to a leak or a breakage, is possible. The volume flow sensors must then be arranged without by-pass valves, in the main stream of the pressure and return lines.

What I claim as my invention and desire to secure by Letters Patent of the United States is:

1. A monitoring system for a hydraulic installation comprising a volume flow sensor having a toothed rotor similar to that in a toothed rotor motor, wherein the movements of the toothed rotor are sensed by no-contact detectors which emit electrical pulses in response to discrete quantities of liquid displaced and in proportion to the volume of a tooth of the toothed rotor, and a device by which said pulses are processable with respect to the direction of flow through the volume flow sensor and to the pulse frequency, said device comprising counting means for counting said pulses after a predetermined limiting frequency of pulses is exceeded, leak signal producing means for producing a signal indicative of leakiness when a specific predetermined number of successive pulses is reached by said counting means during an uninterrupted counting period, and means for automatically resetting said counting means each time said specific predetermined number of successive pulses is not reached during an uninterrupted counting period.

2. The monitoring system of claim 1 further comprising break pulse counting means for counting pulses after a limiting frequency corresponding to a liquid flow due to a break is exceeded, and break signal producing means for producing a signal indicative of a break when a specific predetermined number of successive pulses is reached by said break pulse counting means.

3. The monitoring system of claim 2 further comprising means for automatically resetting said break pulse counting means each time the respective predetermined number of successive pulses is not reached during an uninterrupted counting period.

4. A monitoring system for a hydraulic installation comprising a volume flow sensor having a toothed rotor similar to that in a toothed rotor motor, wherein the movements of the toothed rotor are sensed by no-contact detectors which emit electrical pulses in response to discrete quantities of liquid displaced and in proportion to the volume of a tooth of the toothed rotor, and a device by which said pulses are processable with respect to the direction of flow through the volume flow sensor, said device comprising counting means counting the difference between the number of pulses caused by liquid flowing into said installation and the number of pulses caused by liquid flowing out of said installation, means for comparing said difference with a specific predetermined number, leak signal producing means for producing a signal indicative of leakiness when said specific predetermined number is reached by said counting means during a specified period of time, and means for resetting said counting means to a starting value if the predetermined number is not reached by said counting means during said specified period of time.

5. The monitoring system of claim 4 further comprising break pulse counting means for counting pulses after a limiting frequency corresponding to a liquid flow due to a break is exceeded, and break signal producing means for producing a signal indicative of a break when a specific predetermined number of successive pulses is reached by said break pulse counting means.

6. The monitoring system of claim 4 further comprising means for automatically resetting said break pulse counting means each time the respective predetermined number of successive pulses is not reached during an uninterrupted counting period.

* * * * *